(12) United States Patent
Jones et al.

(10) Patent No.: US 9,995,144 B2
(45) Date of Patent: Jun. 12, 2018

(54) TURBINE BLADE CENTROID SHIFTING METHOD AND SYSTEM

(71) Applicant: General Electric Company, Schenectady, NY (US)

(72) Inventors: Mark Andrew Jones, Greer, SC (US); Lee Larned Brozyna, Mauldin, SC (US)

(73) Assignee: General Electric Company, Schenectady, NY (US)

(*) Notice: Subject to any disclaimer, the term of this patent is extended or adjusted under 35 U.S.C. 154(b) by 210 days.

(21) Appl. No.: 15/046,469

(22) Filed: Feb. 18, 2016

(65) Prior Publication Data

US 2017/0241269 A1    Aug. 24, 2017

(51) Int. Cl.
| | | |
|---|---|---|
| *F01D 5/16* | (2006.01) | |
| *B23P 15/02* | (2006.01) | |
| *F01D 5/14* | (2006.01) | |
| *F01D 5/26* | (2006.01) | |
| *F01D 25/06* | (2006.01) | |

(52) U.S. Cl.
CPC .............. *F01D 5/16* (2013.01); *B23P 15/02* (2013.01); *F01D 5/141* (2013.01); *F01D 5/147* (2013.01); *F01D 5/26* (2013.01); *F01D 25/06* (2013.01); *F05D 2220/32* (2013.01); *F05D 2230/20* (2013.01); *F05D 2240/30* (2013.01); *F05D 2260/96* (2013.01); *F05D 2260/961* (2013.01)

(58) Field of Classification Search
CPC ............. F05D 2220/40; F05D 2220/30; F05D 2220/321–2220/3216; F05D 2240/10; F05D 2240/12–2240/125; F05D 2240/24; F05D 2240/301–2240/307; F05D 2250/71; F01D 9/026; F01D 3/025; F01D 5/048; F01D 5/10; F01D 5/12–5/16; F03D 7/022–7/0224; F03D 7/024; F03D 1/0608; F03D 1/0633; F03D 1/0641; Y02T 50/673
See application file for complete search history.

(56) References Cited

U.S. PATENT DOCUMENTS

| | | | |
|---|---|---|---|
| 4,919,593 A | | 4/1990 | Brown |
| 5,525,038 A | * | 6/1996 | Sharma .................. F01D 5/141 416/223 A |
| 8,439,643 B2 | | 5/2013 | Kuhne et al. |
| 8,480,372 B2 | | 7/2013 | Sparks |

(Continued)

FOREIGN PATENT DOCUMENTS

| | | |
|---|---|---|
| EP | 1 645 720 A1 | 4/2006 |
| EP | 1 826 413 A2 | 8/2007 |
| EP | 2 860 347 A1 | 4/2015 |

OTHER PUBLICATIONS

David Gordon Wilson, Glossary of Terms, "The Design of High-Efficiency Turbomachinery and Gas Turbines", 1984, $5^{th}$ printing 1991, pp. 487-492.

(Continued)

*Primary Examiner* — Jun Yoo
(74) *Attorney, Agent, or Firm* — Dority & Manning, P.A.

(57) ABSTRACT

A method for producing a rotating turbine blade and tuning the natural frequencies of the blade is disclosed that changes the second effective beam length of the blade thereby changing the separation between the first natural frequency and the second natural frequency of the blade.

19 Claims, 2 Drawing Sheets

(56) References Cited

U.S. PATENT DOCUMENTS

| | | |
|---|---|---|
| 2015/0110617 A1 | 4/2015 | Stein et al. |
| 2015/0110629 A1 | 4/2015 | Brozyna et al. |
| 2015/0139789 A1 | 5/2015 | Schoenenborn |
| 2015/0345297 A1 | 12/2015 | Neubrand et al. |
| 2017/0067487 A1* | 3/2017 | Hartung .................... F01D 5/16 |
| 2017/0175530 A1* | 6/2017 | Soni ........................ F01D 5/145 |
| 2017/0226863 A1 | 8/2017 | Brozyna et al. |

OTHER PUBLICATIONS

Extended European Search Report and Opinion issued in connection with corresponding EP Application No. 17156618.5 dated Jul. 11, 2017.

* cited by examiner

TURBINE BLADE CENTROID SHIFTING METHOD AND SYSTEM

FIELD OF THE DISCLOSURE

This disclosure relates to a system and method for producing a gas turbine blade by shifting blade stack centroids that are further defined by three blade stack portions. The gas turbine blade according to the present disclosure is not restricted to a gas turbine. Rotor blades or guide vanes of turbo-machinery are within the scope of the present disclosure.

BACKGROUND OF THE DISCLOSURE

Rotating gas turbine blades must fulfill a multitude of material and design criteria that consider high mechanical and thermal stresses acting on the rotating blades during operation. Due to enormous centrifugal forces acting onto rotating blades and an enormous thermal load that must withstand the blades, the primary blade design task is to provide a high degree of stiffness and avoid blade vibrations during operation. Active cooling using cooling channels inside the airfoil of a rotating blade must also be considered. Thermal coatings on blades is yet another design consideration. A method for 'tuning' the natural frequency of a blade by altering the airfoil shape is sought to improve aeromechanic natural frequency margin to stimuli while maintaining or improving aerodynamic performance.

Rotating blades are arranged in rows which alternate in axial direction with rows of stationary vanes. Every pair of rows include one row of stationary vanes and one row of rotating blades which follows directly downstream to form a so called stage. All stages of the turbine are numbered in sequence beginning with the first stage at the inlet opening of the turbine having the first row of stationary vanes followed by the first row of rotating blades.

Normal operation of a gas turbine shows that the stationary vanes, e.g. of the first stage, are excitation sources for vibrations acting on the subsequent rotating blades resonating at a second natural frequency. Reducing the effects of such excitation sources to avoid vibration transmission and excitation onto rotating blades arranged downstream of vanes in any stage is advantageous. Altering the difference, i.e. separation, between the first natural frequency of the gas turbine blade to the second excitation natural frequency caused by stationary vanes can reduce these effects.

With a conventional airfoil stack, changing airfoil chord distribution is a typical approach to tuning axial frequencies. Typically, root chord is increased and tip chord is reduced in an effort to increase axial frequencies. This will generally increase both the 1st and 2nd harmonics of the axial frequency, so margin to stimuli can only be gained on one (but not both) of these modes. Another approach would be to alter the radial length of the blade, which may require significant changes to the turbine architecture. These changes likely create significant performance penalties.

Current techniques for "tuning" unshrouded blade axial frequencies have several drawbacks. The 1st axial (1A) and 2nd axial (2A) modes tend to respond in a similar manner to airfoil changes, i.e. both increase or both decrease in frequency. Commonly, gaining margin on one mode results in losing margin on the other mode.

BRIEF DESCRIPTION OF THE DISCLOSURE

Aspects and advantages of the disclosure will be set forth in part in the following description, or may be obvious from the description, or may be learned through practice of the disclosure.

A method for producing a rotating turbine blade is disclosed having the steps of determining the mass, chord distribution, trailing edge plane, a first natural frequency defining a first effective beam length, and a second natural frequency defining a second effective beam length of a current blade, the first and second natural frequency corresponding to any resonant frequency of the current blade, defining an upper portion with an upper centroid, a middle portion with a middle centroid, and a lower portion with a lower centroid of the current blade, shifting the middle centroid of the current blade in a first direction relative to the lower centroid, shifting the upper centroid of the current blade in a second direction relative to the lower centroid, the second direction being different than the first direction, and performing the above steps to change the second effective beam length thereby changing the separation between the first natural frequency and the second natural frequency of the modified blade. A system for tuning blade natural frequencies is also disclosed.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
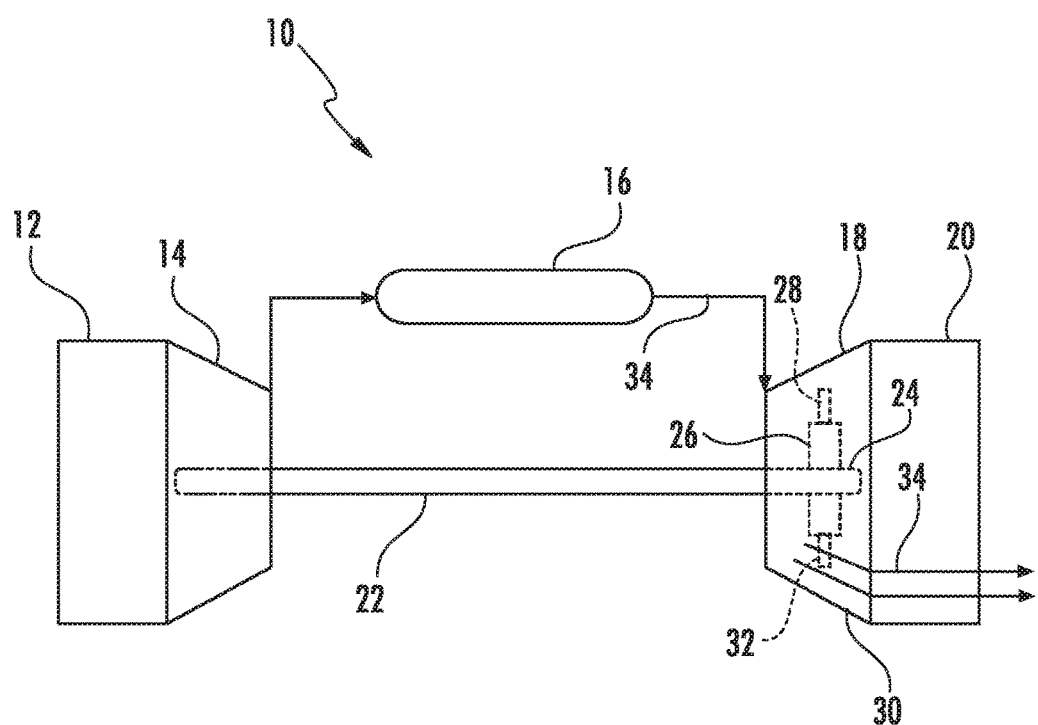
FIG. 1 illustrates a functional diagram of an exemplary gas turbine as may incorporate at least one embodiment of the present disclosure.

Repeat use of reference characters in the present specification and drawings is intended to represent the same or analogous features or elements of the present disclosure.

DETAILED DESCRIPTION OF THE DISCLOSURE

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Stacking line is defined as a line on the surface of the pressure side of the airfoil extending from 0% to 100% span at an axial position of 50%±5% of axial chord length. Axial chord length is defined as the length of the projection of the blade, as set in the turbine, onto a line parallel to the turbine axis. Chord length is defined as the length of the perpendicular projection of the blade profile onto the chord line, which is approximately equal to the linear distance between the leading edge and the trailing. Effective beam length (L) is defined as the length used in the equation below for beam natural frequency ($\omega_n$) of a particular component, and/or the length used in calculating a turbine blade natural frequency ($\omega_n$) in accordance with the equation;

$$\omega_n \propto \sqrt{\frac{EI}{m} \cdot \frac{1}{L^2}}$$

where: L=effective beam length (L1 and L2)
m=mass of effective beam

As used herein, the terms "first", "second", and "third" may be used interchangeably to distinguish one component from another and are not intended to signify location, importance of the individual components, or specific blade frequencies. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component and/or substantially perpendicular to an axial centerline of the turbomachine, and the term "axially" refers to the relative direction that is substantially parallel and/or coaxially aligned to an axial centerline of a particular component and/or to an axial centerline of the turbomachine, and the term "circumferentially" refers to the relative direction that is substantially parallel to the circumference of a particular component and/or substantially parallel to the turbomachine annular casing element.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although an industrial or land based gas turbine is shown and described herein, the present disclosure as shown and described herein is not limited to a land based and/or industrial gas turbine unless otherwise specified in the claims. For example, the disclosure as described herein may be used in any type of turbine including but not limited to a steam turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, where the energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
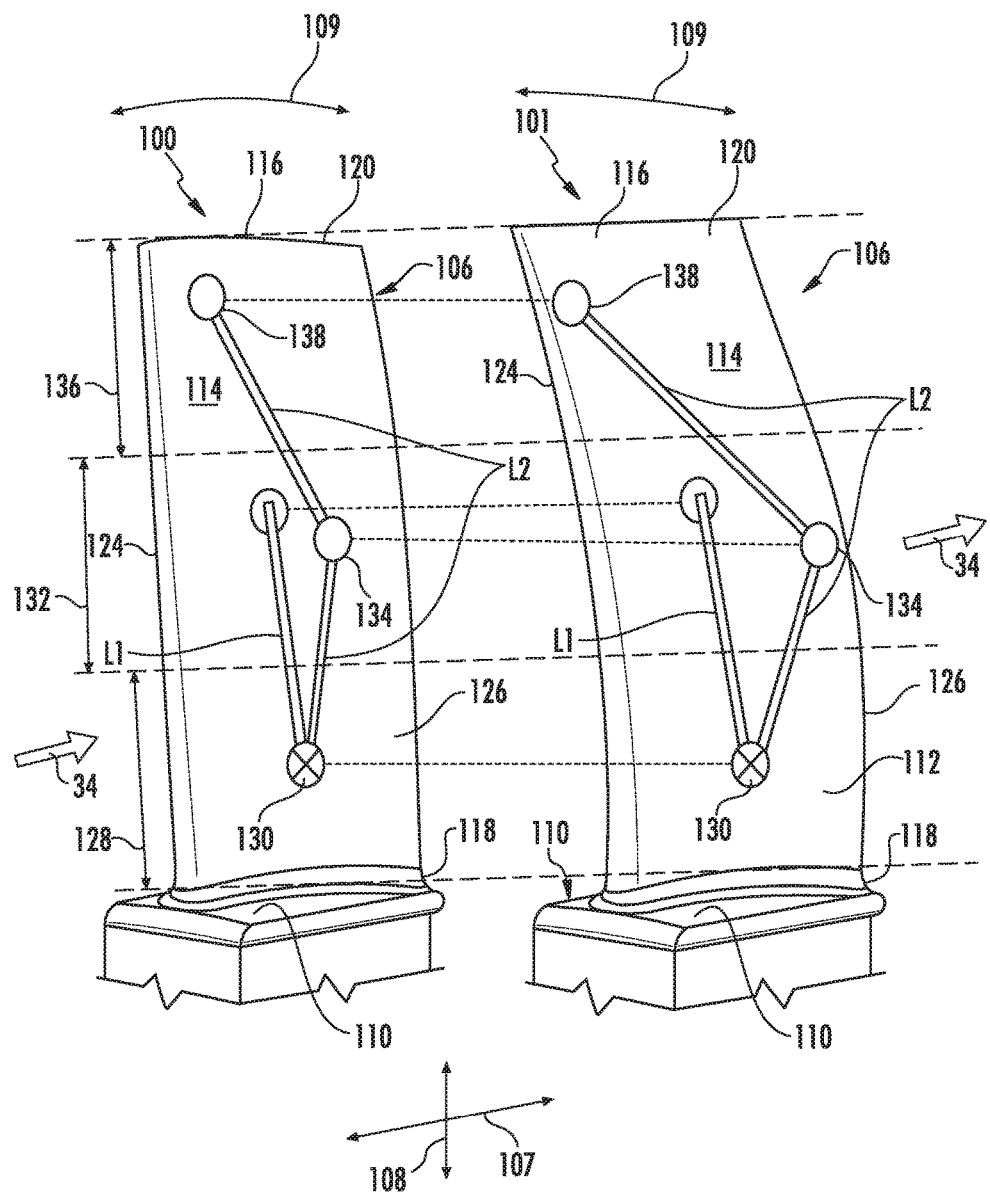
FIG. 2 is a perspective view of an exemplary current rotor blade and modified rotor blade as may be incorporated in the gas turbine shown in FIG. 1 and as may incorporate various embodiments of the present disclosure.

FIG. 2 is a perspective view of an exemplary current rotor blade 100 and a modified rotor blade 101 as may incorporate one or more embodiments of the present disclosure and as may be incorporated into the turbine section 18 of the gas turbine 10 in place of rotor blade 28 as shown in FIG. 1. As shown in FIG. 2, the current rotor blade 100 and modified rotor blade 101 generally include an airfoil 106 that extends in span outwardly in a radial direction 108 from a platform portion 110 of the rotor blade 100. The platform 110 generally serves as a radially inward flow boundary for the combustion gases 34 flowing through the hot gas path 32 of the turbine section 18 (FIG. 1).

The airfoil 106 includes an outer surface 112 that surrounds the airfoil 106. The outer surface 112 is at least partially defined by a pressure side wall 114 and an opposing suction side wall 116. The pressure side wall 114 and the suction side wall 116 extend substantially radially outwardly from the platform 110 in span from a root 118 of the airfoil 106 to a blade tip or tip 120 of the airfoil 106. The root 118 of the airfoil 106 may be defined at an intersection between the airfoil 106 and the platform 110. The blade tip 120 is disposed radially opposite the root 118.

The pressure side wall 114 and the suction side wall 116 are joined together or interconnected at a leading edge 124 of the airfoil 106 which is oriented into the flow of combustion gases 34. The pressure side wall 114 and the suction side wall 116 are also joined together or interconnected at a trailing edge 126 of the airfoil 106 which is spaced downstream from the leading edge 124. The pressure side wall 114 and the suction side wall 116 are continuous about the trailing edge 126. The pressure side wall 114 is generally concave and the suction side wall 116 is generally convex. The chord of the airfoil 106 is the length of a straight line connecting the leading edge 114 and the trailing edge 116 and the direction from the leading edge 114 to the trailing edge 116 is typically described as the chordwise direction.

Also in FIG. 2, both the current rotor blade 100 and the modified rotor blade 101 are divided into three approximate portions; the lower portion 128, the middle portion 132 and the upper portion 136. The modified rotor blade 101 is produced by the steps of: determining the mass (m), chord distribution, trailing edge 126 plane, a first natural frequency defining a first effective beam length (L1), and a second natural frequency defining a second effective beam length (L2), defined as the sum of the two legs shown in FIG. 2, the first and second natural frequency corresponding to any resonant frequency of the current rotor blade 100; defining an upper portion 136 with an upper centroid 138, a middle portion 132 with a middle centroid 134, and a lower portion 128 with a lower centroid 130 of the current blade 100; shifting the middle centroid 134 of the blade in a first direction; shifting the upper centroid 138 of the blade 100 in a second direction, the second direction being different than the first direction; retaining the lower centroid 130 position; and performing the above steps to change the second effective beam length (L2) thereby changing the separation between the first natural frequency and the second natural frequency of the modified blade 101.

The method can additionally involve maintaining a constant mass (m), a constant chord distribution and a constant first effective beam length (L1) of the current blade. The method can also involve resonant frequencies such that the first and second natural frequencies are at least one frequency selected from the group consisting of axial, flexural and torsional frequency. Also, the method can involve shifting steps such that the first and second directions are at least one direction selected from the group consisting of circumferential 109, radial 108 and axial 107 and mixtures thereof. The first and second directions can also be opposing directions. An additional method practice can involve keeping the trailing edge 126 plane constant while shifting the centroids. Yet another method practice can involve a step where the chord length through the centroid of the upper 136, middle 132, and lower 128 portions of the current blade is maintained for the corresponding chord length of the modified blade. The method can involve an additional step of performing the shifting steps such that the upper 138 and middle 134 centroids move at a fixed radial 108 distance relative to each other. Each centroid can be radially 108 positioned midway on each respective portion. This method can result in reduction of the aero loading on the blade tip. The method can also be used as a system for tuning blade natural frequencies ($\omega_n$) for an unshrouded or shrouded turbine blade.

This method and system promotes separation between natural frequency modes of the turbine blade. Frequency margin can be gained on one (or both) modes without adversely affecting the other. Using this blade stacking method and system changes the blade second effective length (L2) that is proportional to the second axial frequency. In doing so, the first effective length (L1) that dictates the first axial frequency is unaffected, which promotes the frequency separation and improved tuning margin. In addition to changing the effective length (L2) of the second axial frequency, this stacking method and system imposes a force on the hot gas 34 fluid flow that reduces the blade tip 120 loading, thereby improving aerodynamic performance and reducing tip clearance sensitivity.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for producing a rotating turbine blade comprising the steps of:

determining the mass, chord distribution, a first natural frequency defining a first effective beam length, and a second natural frequency defining a second effective beam length of a current blade, wherein the first and second natural frequency correspond to any resonant frequency of the current blade, defining an upper portion with an upper centroid, a middle portion with a middle centroid, and a lower portion with a lower centroid of the current blade, shifting the middle centroid of the current blade in a first direction relative to the lower centroid, shifting the upper centroid of the current blade in a second direction relative to the lower centroid, the second direction being different than the first direction, performing the shifting steps such that the centroids move at a fixed radial distance relative to each other, and performing the above steps to change the second effective beam length thereby changing the separation between the first natural frequency and the second natural frequency of the modified blade, wherein aero loading on the blade tip is reduced.

2. The method according to claim 1 further comprising the step of:

maintaining a constant mass, a constant chord distribution and a constant first effective beam length of the current blade.

3. The method according to claim 1, wherein the first and second natural frequencies are at least one frequency selected from the group consisting of axial, flexural and torsional frequency.

4. The method according to claim 1, wherein the first and second direction are at least one direction selected from the group consisting of circumferential, radial and axial and mixtures thereof.

5. The method of claim 1, wherein the first and second direction are opposing.

6. The method according to claim 1, wherein the chord length through the centroid of the upper, middle, and lower portions of the current blade is maintained for the corresponding chord length of the modified blade.

7. The method according to claim 1, wherein each centroid is radially positioned midway on each respective portion.

8. A system for tuning blade natural frequencies comprising a turbine blade produced by:

determining the mass, chord distribution, a first natural frequency defining a first effective beam length, and a second natural frequency defining a second effective beam length of a current blade, wherein the first and second natural frequency correspond to any resonant frequency of the current blade, defining an upper portion with an upper centroid, a middle portion with a middle centroid, and a lower portion with a lower centroid of the current blade, shifting the middle centroid of the current blade in a first direction relative to the lower centroid, shifting the upper centroid of the current blade in a second direction relative to the lower centroid, the second direction opposing the first direction, and performing the above steps to change the second effective beam length thereby changing the separation between the first natural frequency and the second natural frequency of the modified blade.

9. The system of claim 8 further comprising the step of: maintaining a constant mass, a constant chord distribution and a constant first effective beam length of the current blade.

10. The system according to claim 8, wherein the first and second natural frequencies are at least one frequency selected from the group consisting of axial, flexural and torsional frequency.

11. The system according to claim 8, wherein the first and second direction are at least one direction selected from the group consisting of circumferential, radial and axial and mixtures thereof.

12. The system according to claim 8, wherein the chord length through the centroid of the upper, middle, and lower portions of the current blade is maintained for the corresponding chord length of the modified blade.

13. The system according to claim 8, further comprising the step of:
performing the shifting steps such that the centroids r me at a fixed radial distance relative to each other.

14. The system according to claim 13, wherein each centroid is radially positioned midway on each respective portion.

15. The system according to claim 13, wherein aero loading on the blade tip is reduced.

16. A method of producing a rotating turbine blade, the method comprising:
determining the mass, chord distribution, a first natural frequency defining a first effective beam length, and a second natural frequency defining a second effective beam length of a current blade, wherein the first and second natural frequency correspond to any resonant frequency of the current blade,
defining an upper portion with an upper centroid, a middle portion with a middle centroid, and a lower portion with a lower centroid of the current blade,
shifting the middle centroid of the current blade in a first direction relative to the lower centroid,
shifting the upper centroid of the current blade in a second direction relative to the lower centroid, the second direction being different than the first direction, and
performing the above steps to change the second effective beam length thereby changing the separation between the first natural frequency and the second natural frequency of the modified blade,
wherein the chord length through the centroid of the upper, middle, and lower portions of the current blade is maintained for the corresponding chord length of the modified blade.

17. The method of claim 16, further comprising performing the shifting steps such that the centroids move at a fixed radial distance relative to each other.

18. The method of claim 17, wherein each centroid is radially positioned midway on each respective portion.

19. The method of claim 17, wherein aero loading on the blade tip is reduced.

* * * * *